(12) United States Patent
Chang et al.

(10) Patent No.: US 11,868,839 B2
(45) Date of Patent: Jan. 9, 2024

(54) DEVICE DETECTING SYSTEM

(71) Applicant: ASUSTeK COMPUTER INC., Taipei (TW)

(72) Inventors: Chien-Chih Chang, Taipei (TW); Pei-Yin Chen, Taipei (TW); Wei-Han Lin, Taipei (TW); Bo-Rong Chu, Taipei (TW); Yen-Ting Liu, Taipei (TW); Yu-Shen Mai, Taipei (TW); Kuan-Yu Hsiao, Taipei (TW); Chia-Hsien Lin, Taipei (TW); Pei-Yu Liao, Taipei (TW); Chun-Yen Lai, Taipei (TW); Sheng-Yi Chen, Taipei (TW)

(73) Assignee: ASUSTEK COMPUTER INC., Taipei (TW)

( * ) Notice: Subject to any disclaimer, the term of this patent is extended or adjusted under 35 U.S.C. 154(b) by 0 days.

(21) Appl. No.: 17/737,082

(22) Filed: May 5, 2022

(65) Prior Publication Data

US 2022/0366161 A1 Nov. 17, 2022

(30) Foreign Application Priority Data

May 12, 2021 (TW) .................................. 110117158

(51) Int. Cl.
*G06K 7/08* (2006.01)
*G06K 7/10* (2006.01)
*G06F 9/4401* (2018.01)
*G06K 7/14* (2006.01)

(52) U.S. Cl.
CPC ....... *G06K 7/10366* (2013.01); *G06F 9/4401* (2013.01); *G06K 7/1413* (2013.01)

(58) Field of Classification Search
CPC .. G06Q 20/20; G06Q 20/4037; G06Q 20/401; G06K 7/1413; G06K 19/06028; G06K 7/10366; G06K 7/10881; G06K 7/1417
USPC .......................................... 235/451, 385, 454
See application file for complete search history.

(56) References Cited

U.S. PATENT DOCUMENTS

| 7,382,261 | B2 | 6/2008 | Lin et al. | |
|---|---|---|---|---|
| 2001/0013025 | A1* | 8/2001 | Ananda | G06Q 20/401 705/400 |
| 2014/0354403 | A1* | 12/2014 | Zaniker | G06Q 20/4012 340/5.54 |

(Continued)

FOREIGN PATENT DOCUMENTS

| CN | 103679520 B | 10/2017 |
|---|---|---|
| CN | 107658938 A | 2/2018 |
| CN | 108876543 A | 11/2018 |

(Continued)

*Primary Examiner* — Daniel St Cyr
(74) *Attorney, Agent, or Firm* — McClure, Qualey & Rodack, LLP

(57) ABSTRACT

A device detecting system is provided. The device detecting system includes a bar code scanner, a plurality of device accommodating spaces, a screen, and a server. The server obtains bar code information via the bar code scanner and opens one of the device accommodating spaces based on the bar code information to accommodate an electronic device. The server performs a test procedure on the electronic device to generate a test result, and displays the test result and operation information corresponding to the test result on the screen.

9 Claims, 8 Drawing Sheets

(56) References Cited

U.S. PATENT DOCUMENTS

2019/0361917 A1* 11/2019 Tran .................... H04W 12/108

FOREIGN PATENT DOCUMENTS

| TW | I331304 B | 10/2010 |
| --- | --- | --- |
| TW | M563016 U | 7/2018 |

* cited by examiner

DEVICE DETECTING SYSTEM

CROSS-REFERENCE TO RELATED APPLICATION

This application claims the priority benefit of Taiwan Application Serial No. 110117158, filed on May 12, 2021. The entirety of the above-mentioned patent application is hereby incorporated by reference herein and made a part of the specification.

BACKGROUND OF THE INVENTION

Field of the Invention

The disclosure relates to a device detecting system.

Description of the Related Art

Existing rental devices or product pickup devices are usually designed for products that do not need to be returned, or designed for products to be directly provided to a next user for rental without detecting the integrity of products after return.

However, when an item provided for rental is an electronic product (which is a laptop computer, a tablet computer, a mouse, or a mobile power bank in some embodiments), without detection after return by a user, it is difficult to determine whether a structural component or an internal element of the electronic product is damaged or even replaced. When a next user rents a damaged electronic product, the rights and interests of the user are affected, and damage is caused to both the brand reputation of a service provider providing the rental of the electronic product and the rented commodity.

BRIEF SUMMARY OF THE INVENTION

According to an aspect, a device detecting system is provided. The device detecting system includes a bar code scanner, a plurality of device accommodating spaces, a screen, and a server. The server is electrically connected to the bar code scanner, the device accommodating spaces, and the screen, and is configured to perform the following operations: obtaining bar code information via the bar code scanner; opening one of the device accommodating spaces based on the bar code information to accommodate an electronic device; performing a test procedure on the electronic device to generate a test result; and displaying the test result and operation information corresponding to the test result on the screen.

In summary, after a user returns a rented electronic device, the device detecting system provided in the disclosure detects whether the appearance of the electronic device is complete, whether structural components and hardware meet preset conditions, and whether the functions of elements are normal. The device detecting system also prompts the user with charging information after the electronic device passes various tests, and prompts the user with repair information or to report a repair when the electronic device is damaged.

Other objectives of the disclosure, as well as technical measures and implementation aspects of the disclosure, will be apparent to persons of ordinary skill in the art with reference to the drawings and the following described embodiments.

DETAILED DESCRIPTION OF THE EMBODIMENTS

The following embodiments are used to describe technical content of the disclosure through examples and are not intended to limit the scope of the disclosure. It is to be noted that elements not related to the disclosure are omitted and not shown in the following embodiments and accompanying drawings. Size relationships of elements in the accompanying drawings are only for ease of understanding and are not intended to limit the actual scale.

Figure 1:
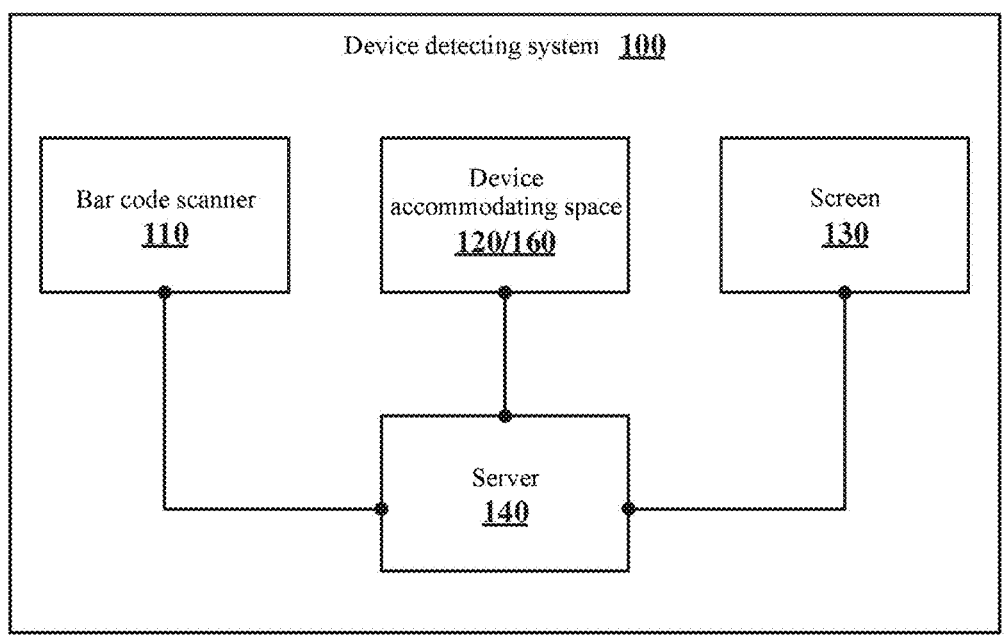
FIG. 1 is a schematic diagram of a device detecting system according to the disclosure.
Figure 2:
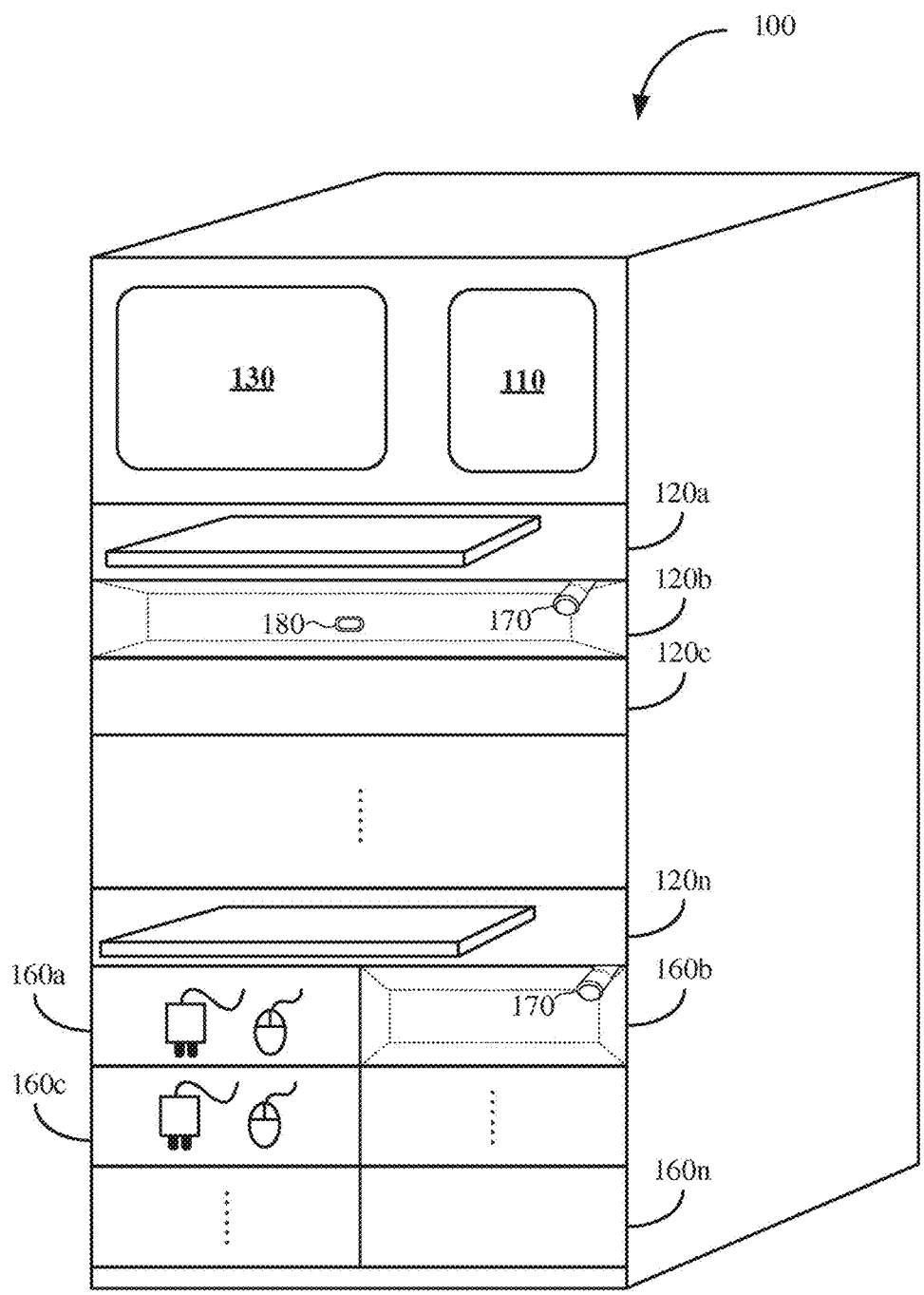
FIG. 2 shows an embodiment of a device detecting system according to the disclosure.
Figure 3:
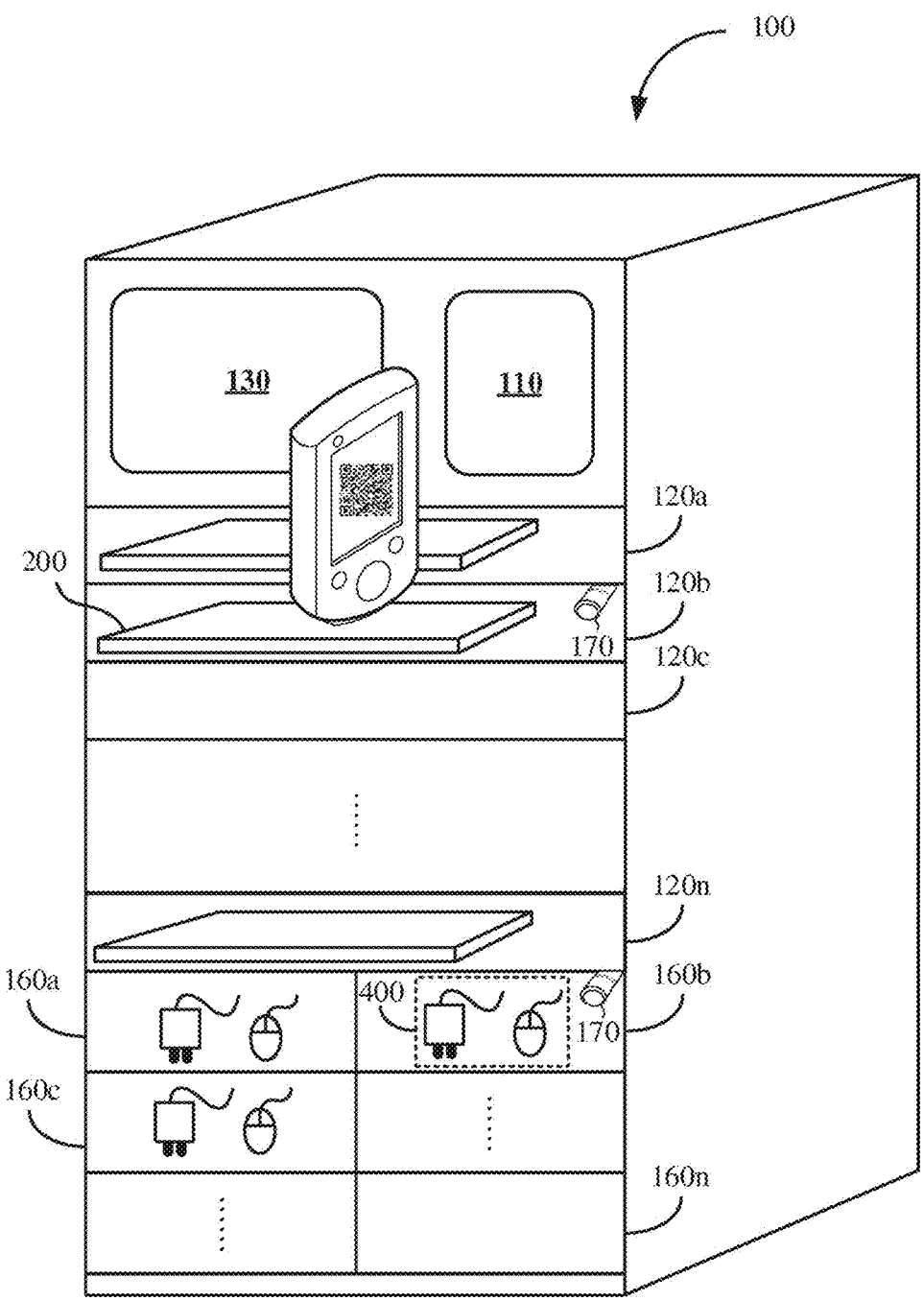
FIG. 3 shows an embodiment of a device detecting system according to the disclosure.

FIG. 1, FIG. 2, and FIG. 3 are schematic diagrams of a device detecting system according to the disclosure. A device detecting system 100 includes a bar code scanner 110, a plurality of device accommodating spaces 120a, 120b, 120c, . . . , and 120n (collectively represented by a device accommodating space 120 in FIG. 1) and 160a, 160b, 160c, . . . , and 160n (collectively represented by a device accommodating space 160 in FIG. 1), a screen 130, and a server 140. The server 140 is electrically connected to the bar code scanner 110, the device accommodating spaces 120a, 120b, 120c, . . . , and 120n, and the screen 130.

In an embodiment, when a user wants to return an electronic device 200 (which is a laptop computer in some embodiments) or an electronic device 400 (which is an accessory such as a mouse or a charger in some embodiments) rented before from the device detecting system 100, the user first clicks/taps a return-related operation on a mobile phone to obtain a bar code (which is a one-dimensional bar code or a two-dimensional bar code in some embodiments) required for the return. The user presents the bar code within a scanning range of the bar code scanner 110 of the device detecting system 100. The server 140 obtains bar code information through the bar code scanner 110. After confirming that the bar code information is correct, the server 140 opens one of the device accommodating spaces 120a, 120b, 120c, . . . , and 120n and 160a, 160b, 160c, . . . , and 160n to correspondingly accommodate the electronic device 200 (which is a laptop computer in some embodiments) or the electronic device 400 (which is a mouse in some embodiments).

In an embodiment, after the bar code scanner 110 scans a first bar code, the server 140 determines, based on bar code information, which device accommodating spaces 120a, 120b, 120c, . . . , and 120n and 160a, 160b, 160c, . . . , and 160n have not accommodated electronic devices, so as to accordingly open a device accommodating space 120b (or 160*b*) in which no electronic device is accommodated. Therefore, the user places the electronic device 200 (or 400) to be returned.

In an embodiment, one of various different types of connectors 180 is provided in each of the device accommodating spaces 120*a*, 120*b*, 120*c*, . . . , and 120*n*. The connectors include, but are not limited to, a USB-A connector and a type-C connector. When the device accommodating space 120*b* (or 160*b*) in which no electronic device 200 (or 400) is accommodated is opened, the server 140 displays operation information on the screen 130. The operation information is about placing the electronic device 200 (or 400) into the opened device accommodating space 120*b* (or 160*b*) and connecting the electronic device 200 (or 400) to the connector 180 of the device accommodating space 120*b* (or 160*b*).

When the electronic device 200 (or 400) is connected to the connector 180 of the device accommodating space 120*b* (or 160*b*), the server 140 performs a test procedure on the electronic device 200 (or 400) through the connector 180 of the device accommodating space 120*b* (or 160*b*) to generate a test result. The server 140 displays the test result and the operation information corresponding to the test result on the screen 130.

Figure 4:
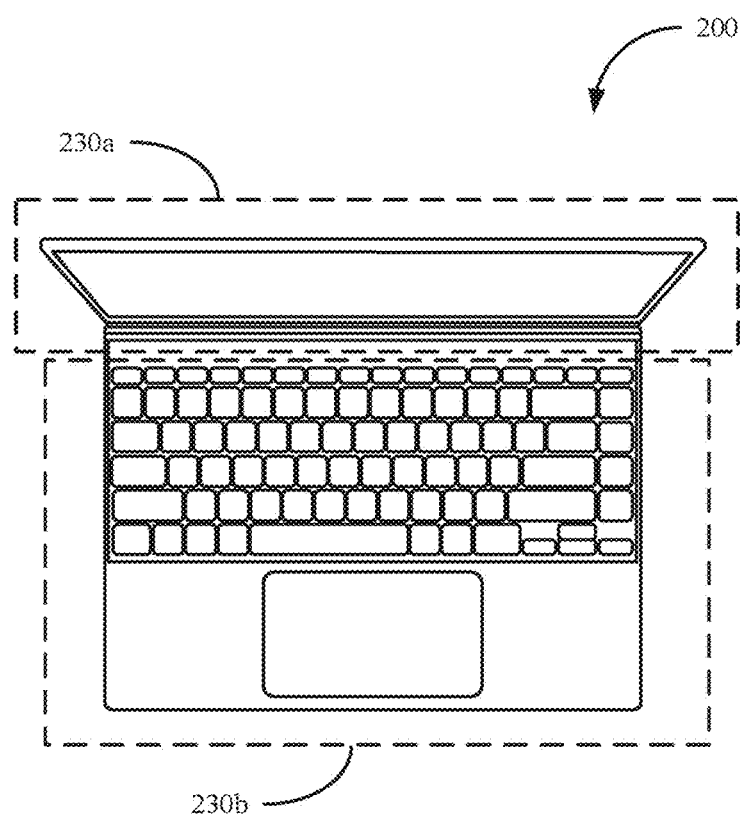
FIG. 4 is a schematic diagram of detection of structural components of an electronic device according to the disclosure.
Figure 5:
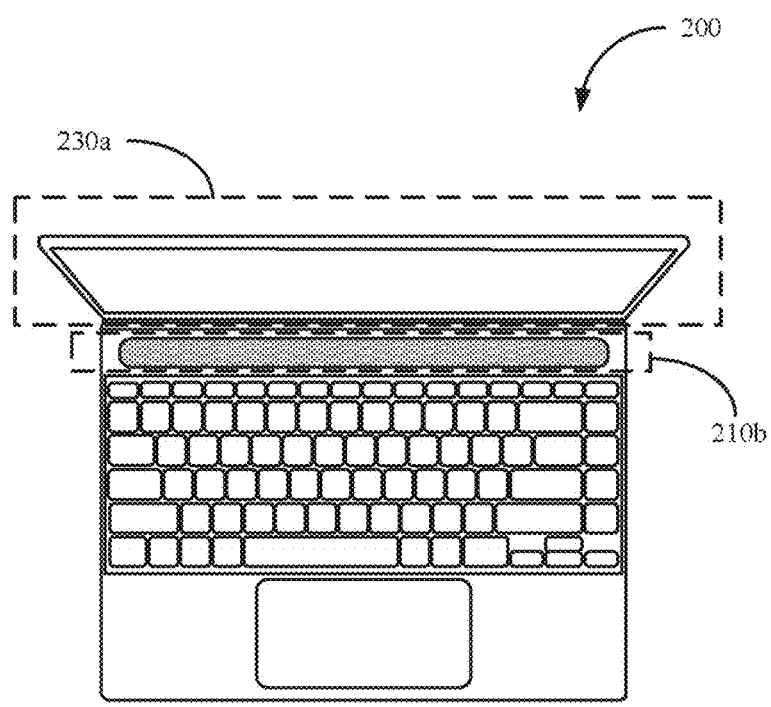
FIG. 5 is a schematic diagram of detection of elements of an electronic device according to the disclosure.

In an embodiment, referring to FIG. 4 and FIG. 5, the electronic device 200 (which is a laptop computer in some embodiments) includes structural components (which are a screen 230*a* and a keyboard 230*b* in some embodiments) with Radio Frequency Identification (RFID) tags. In an embodiment, the server 140 prestores original RFID tags of the screen 230*a* and the keyboard 230*b* of the electronic device 400 (which is a mouse or a charger in some embodiments) and the electronic device 200 (which is a laptop computer in some embodiments). During the test procedure, the server 140 detects whether the RFID tags of the electronic devices 200 and 400 that are returned are consistent with the original RFID tags (which is Step S701 in FIG. 7 in some embodiments). It is to be noted that a quantity of the structural components is only used for description, and is not intended to limit the disclosure.

Figure 7:
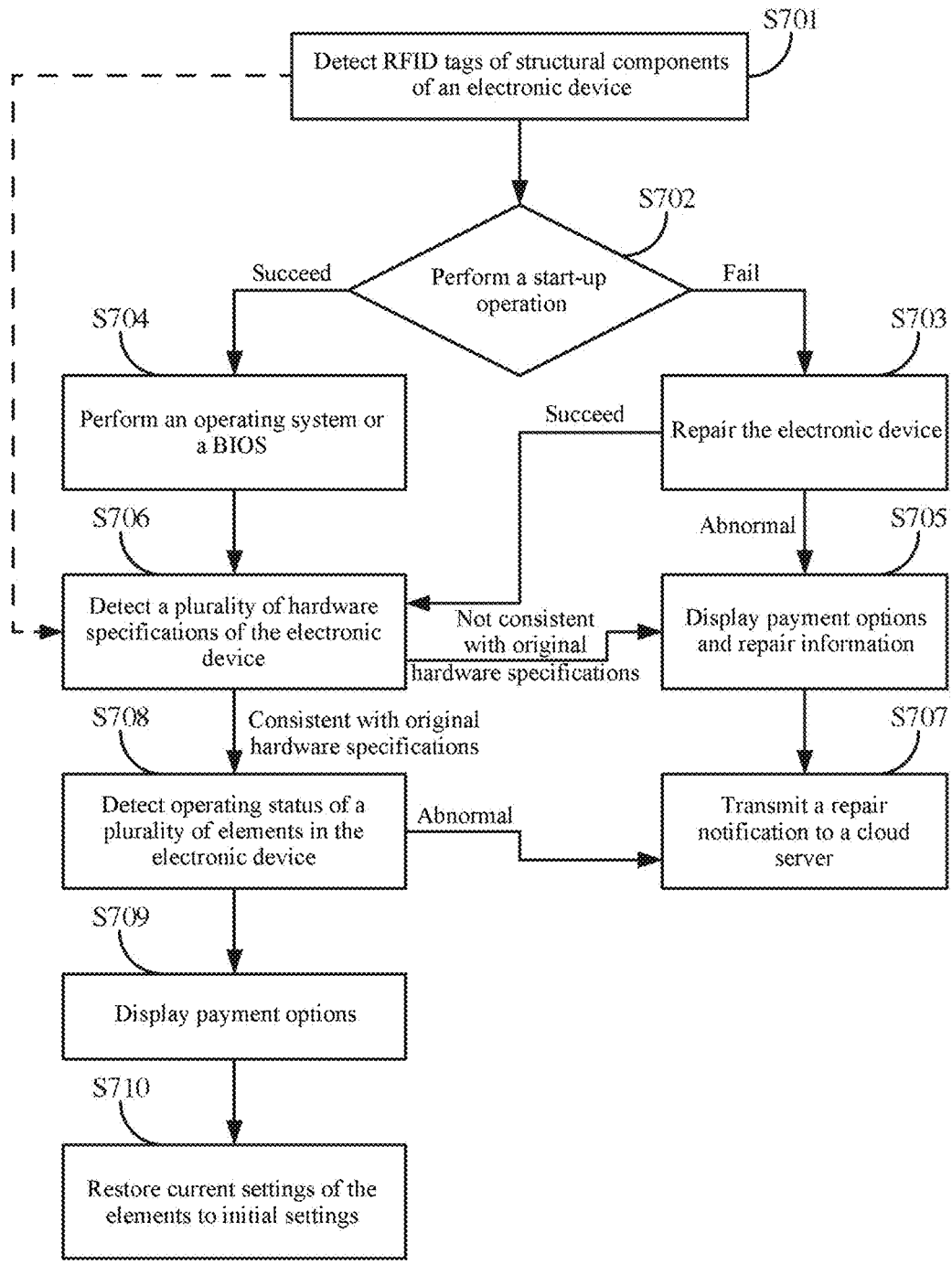
FIG. 7 is a flowchart of the device detecting system according to the disclosure.
Figure 8:
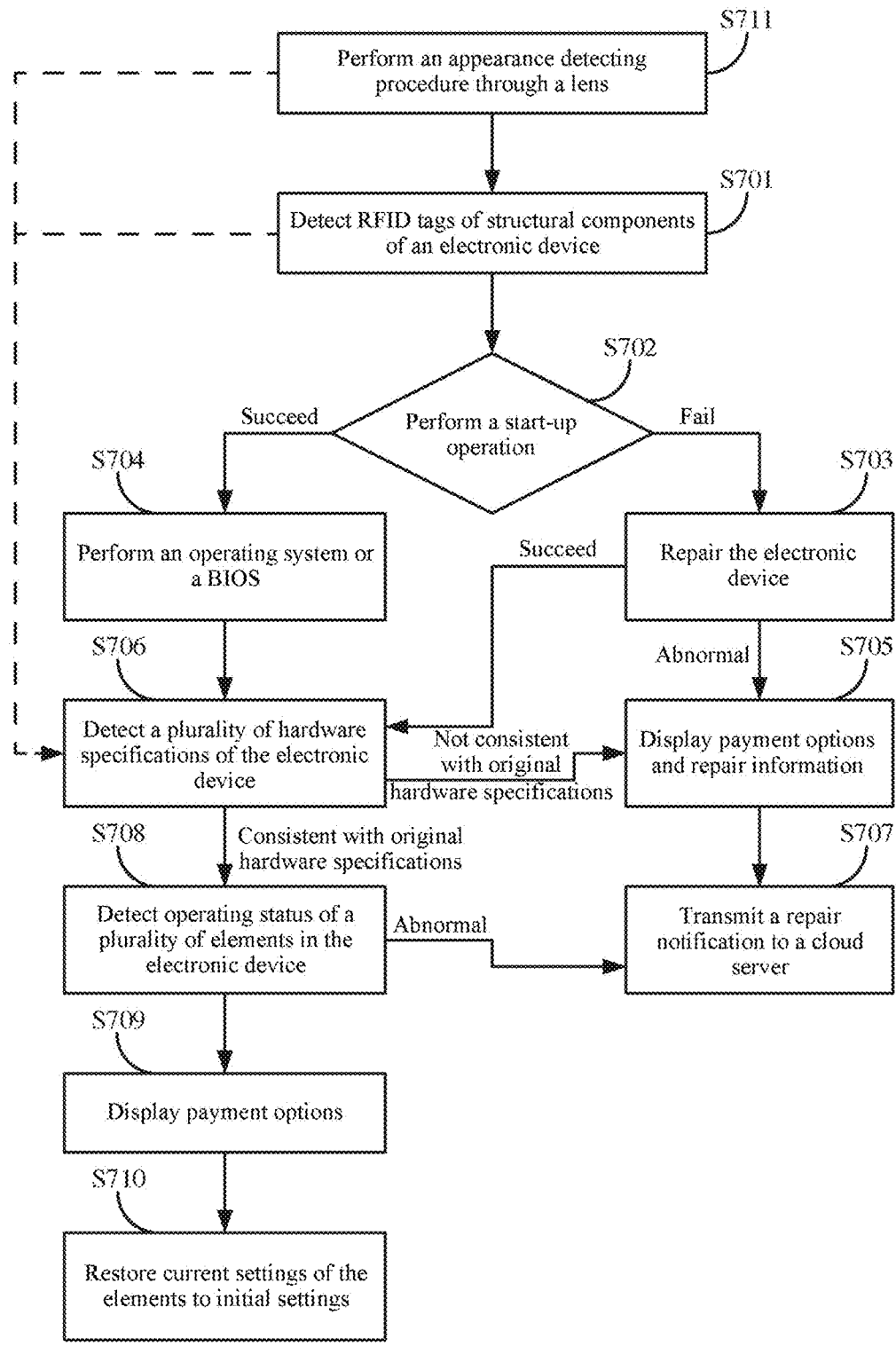
FIG. 8 is a flowchart of the device detecting system according to the disclosure.

To facilitate the description and make the description comprehensible, the following embodiments are described with procedures shown in FIG. 7 and FIG. 8 in combination with the embodiments described above. That is, procedures shown in FIG. 7 and FIG. 8 are applied to the embodiments described above, but are not limited thereto.

In an embodiment, when the server 140 detects that the RFID tags of the screen 230*a* and the keyboard 230*b* of the returned electronic device 200 are consistent with the original RFID tags, the server 140 determines that the test result is abnormal. Further, the server 140 returns a related repair notification to a manufacturer providing an electronic device rental service, and displays the related operation information on the screen 130. The operation information further includes payment options (which are credit card, Easycard, and cash in some embodiments) to require a user to pay a rental fee and a loss fee for the structural components.

In an embodiment, when the RFID tags of the screen 230*a* and the keyboard 230*b* are consistent with the original RFID tags, the server 140 performs Step S702 on the electronic device 200. The server 140 performs a start-up operation to further determine whether the electronic device 200 normally starts up to run.

In an embodiment, when failing to perform the start-up operation on the electronic device 200, the server 140 first performs Step S703 on the electronic device 200 to repair the electronic device 200. When failing to repair the electronic device 200, the server 140 determines that the test result is abnormal. The server 140 performs Step S705 to display the operation information corresponding to the test result on the screen 130. The displayed operation information includes the payment options and repair information.

In an embodiment, when performing the start-up operation on the electronic device 200 and successfully starts up the electronic device 200, the server 140 further performs Step S704 to perform an operating system or a basic input/output system (BIOS), to continue to perform Step S706 to detect a plurality of hardware specifications of the electronic device 200. In an embodiment, the server 140 stores a plurality of original hardware specifications (which are original hardware specifications of hardware such as a central processing unit, a memory, and a storage in some embodiments) of the electronic device 200. During the test procedure, the server 140 detects whether the hardware specifications of the electronic device 200 that is returned are the same as the original hardware specifications. In an embodiment, for the detection of the hardware, in addition to detecting the hardware specifications, it is further detected whether the models of the hardware are the same as the models of the hardware of the electronic device 200 that is rented.

In an embodiment, when at least one of the hardware specifications is not consistent with an original hardware specification of the electronic device 200 that is rented, the server 140 determines that the test result is abnormal. Further, the server 140 returns the repair notification to the manufacturer providing an electronic device rental service, displays the abnormal test result on the screen 130, and displays the payment options and the repair information corresponding to the abnormal test result. Therefore, the user is prompted to pay a rental fee and a loss fee for the hardware.

As shown in FIG. 5 and FIG. 7, in an embodiment, when the hardware specifications of the hardware meet the original hardware specifications of the electronic device 200 that is rented, the server 140 performs Step S708 next to detect operating status of elements (which are the screen 230*a* and a loudspeaker 210*b* in some embodiments) of the electronic device 200. When the operating status is normal, the server 140 determines that the test result is normal, and performs Step S709 to display operation information including the payment options on the screen 130. It is to be noted that the elements of the electronic device 200 under test further include, but are not limited to, elements such as a Wi-Fi transceiver, a Bluetooth transceiver, and a storage.

In an embodiment, a lens 170 is disposed in each of the device accommodating spaces 120*a*, 120*b*, 120*c*, . . . , and 120*n* and 160*a*, 160*b*, 160*c*, . . . , and 160*n* of the device detecting system 100 (as shown in FIG. 2 and FIG. 3). In an embodiment, the server 140 performs an appearance detecting procedure on the electronic device 200 or 400 in the device accommodating space through the lens 170 (which is Step S711 in FIG. 8 in some embodiments). The server 140 is electrically connected to the lens 170 and takes a picture or records a video of the appearance of the electronic device 200 or 400 from different angles, or remotely operates the lens 170 in real time to capture a related image to determine and examine whether the appearance of the electronic device 200 or 400 is normal.

Figure 6:
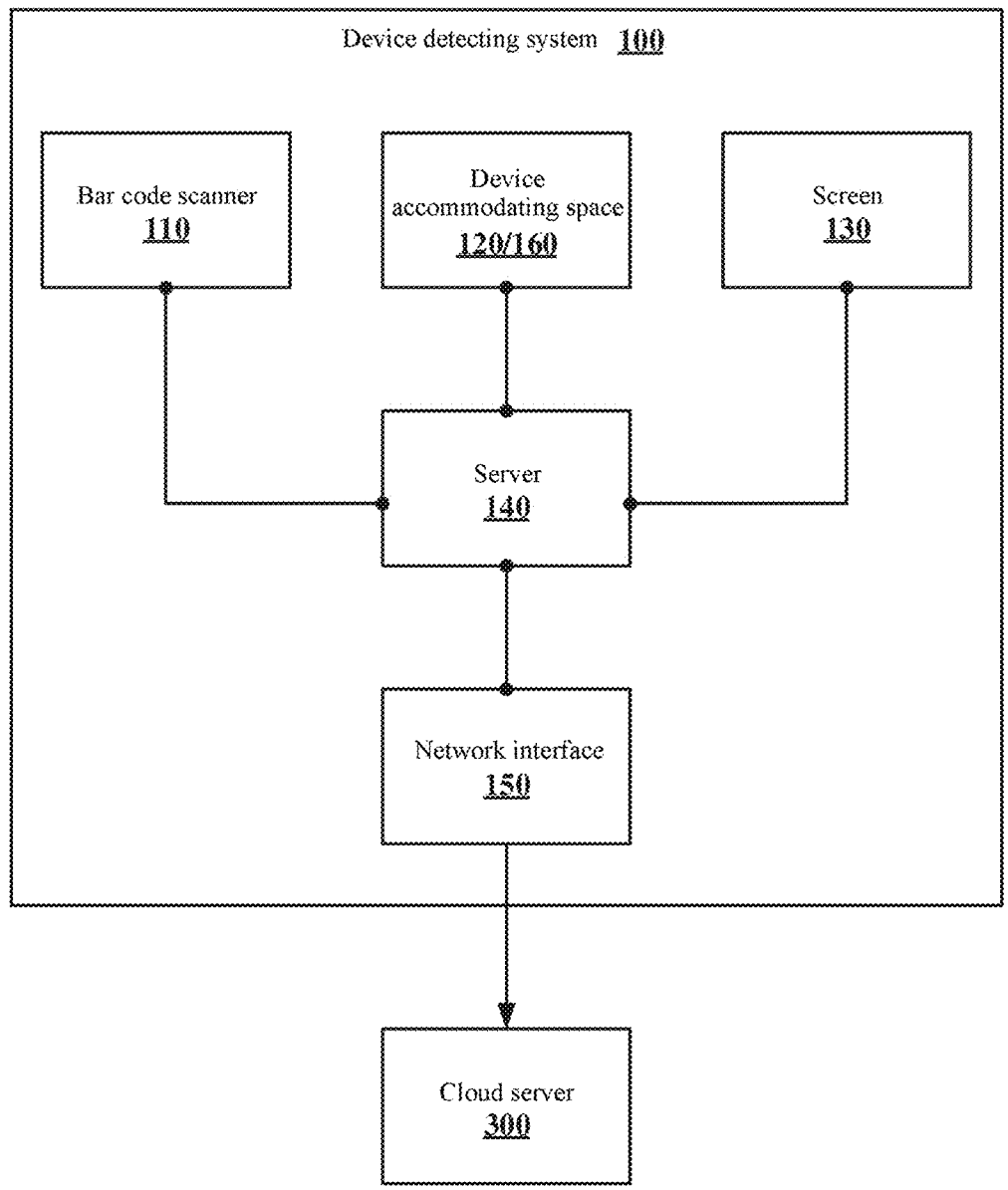
FIG. 6 is a schematic diagram of a device detecting system according to the disclosure.

In an embodiment, referring to FIG. 6, the device detecting system 100 further includes a network interface 150. The server 140 is electrically connected to the network interface 150 to connect to a network via the network interface 150 and transmits the repair notification to a cloud server 300 via the network. Therefore, after receiving the repair notification, the manufacturer providing an electronic device rental service goes to the location of the device detecting system 100 to retrieve electronic devices that needs to be repaired.

In an embodiment, after completing the foregoing test procedure on the electronic device 200, the server 140 performs Step S710 to restore current settings of the elements created by a user to initial settings for use by a next user.

The foregoing embodiments are merely exemplary and are not intended to limit the disclosure. Any person of ordinary skill in the art may make other designs within the scope of the disclosure. In other embodiments, as shown in FIG. 3 and FIG. 7, when the electronic device 400 is a mouse or another device that does require a startup test, after Step S701 in which the server 140 detects the electronic device 400 (which is a mouse in some embodiments), the server 140 directly continues to perform Step S706 to detect a plurality of hardware specifications of the electronic device 400. In different embodiments, as shown in FIG. 3 and FIG. 8, after Step S711 in which the server 140 performs an appearance detecting procedure on the electronic device 400, the server 140 directly continues to perform Step S706 to detect the plurality of hardware specifications of the electronic device 400.

In summary, after a user returns a rented electronic device, the device detecting system provided in the disclosure detects whether the appearance of the electronic device is damaged, whether structural components and hardware are replaced, whether the functions of elements are normal, and whether accessory electronic products used in combination with the electronic products are damaged or replaced. The device detecting system also charges the user after the electronic device passes various tests, or charges the user for damage and notifies a manufacturer of repair information when the electronic device is damaged.

The embodiments described above are only used to exemplify implementation aspects of the disclosure and illustrate technical features of the disclosure, and are not intended to limit the protection scope of the disclosure. Any change or equivalent arrangement easily made by persons skilled in the art falls with the scope of claims in the disclosure. The protection scope of rights claimed in the disclosure should be subject to the scope of the patent.

What is claimed is:

1. A device detecting system, comprising:
a bar code scanner;
a plurality of device accommodating spaces;
a screen; and
a server, electrically connected to the bar code scanner, the device accommodating spaces, and the screen, and configured to perform the following steps:
obtaining bar code information via the bar code scanner;
opening at least one of the device accommodating spaces based on the bar code information to accommodate an electronic device;
performing a test procedure on the electronic device to generate a test result, and
displaying the test result and operation information corresponding to the test result on the screen;
wherein the electronic device comprises a plurality of structural components, each structural component comprises a Radio Frequency Identification (RFID) tag, and the server is further configured to perform the following operations when the test procedure is performed:
detecting the RFID tags of the structural components of the electronic device; and
performing a start-up operation on the electronic device when the RFID tags are consistent with original RFID tags of the structural components.

2. The device detecting system according to claim 1, wherein the server is further configured to perform the following operations when the server is performing the start-up operation on the electronic device:
performing an operating system or a basic input/output system (BIOS) to detect a plurality of hardware specifications of the electronic device when the electronic device is successfully started up;
detecting operating status of a plurality of elements in the electronic device when the hardware specifications are consistent with original hardware specifications; and
determining that the test result is normal when the operating status of the elements is normal, the operation information comprising payment options.

3. The device detecting system according to claim 2, wherein the server is further configured to perform the following operation:
restoring current settings of the elements to initial settings after the test procedure on the electronic device is completed.

4. The device detecting system according to claim 2, wherein the server is further configured to perform the following operation:
determining that the test result is abnormal, the operation information comprising the payment options and repair information when at least one of the hardware specifications is not consistent with an original hardware specification.

5. The device detecting system according to claim 1, wherein the server is further configured to perform the following operations when the server is performing the start-up operation on the electronic device:
repairing the electronic device when the start-up operation on the electronic device fails;
detecting the hardware specifications of the electronic device when the electronic device is successfully repaired; and
determining that the test result is abnormal when the electronic device fails to be repaired, the operation information comprising the payment options and repair information.

6. The device detecting system according to claim 1, wherein before the detecting the RFID tags of the structural components of the electronic device, the server is further configured to perform an appearance detecting procedure.

7. The device detecting system according to claim 6, wherein a lens is further disposed in each device accommodating space, and the server is further configured to perform the appearance detecting procedure through the lens.

8. The device detecting system according to claim 1, wherein the server is further configured to perform the following operation:
determining that the test result is abnormal when the RFID tags is consistent with the original RFID tags of the structural components, the operation information further comprising repair information.

9. The device detecting system according to claim 1, further comprising a network interface, wherein the server is electrically connected to the network interface to connect to a network via the network interface and transmits a repair notification to a cloud server via the network.

* * * * *